Jan. 9, 1940.  H. BECKER ET AL  2,186,443
MOTION PICTURE CAMERA
Filed Sept. 29, 1937  2 Sheets-Sheet 1
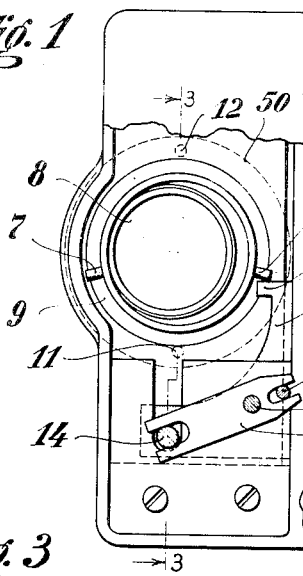
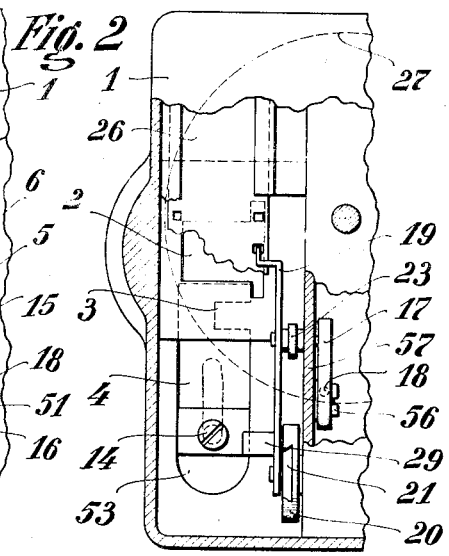
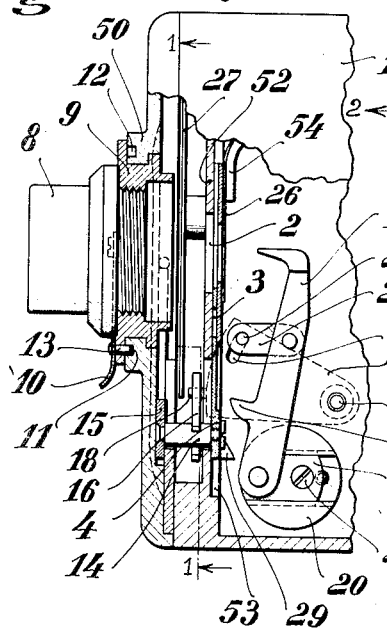
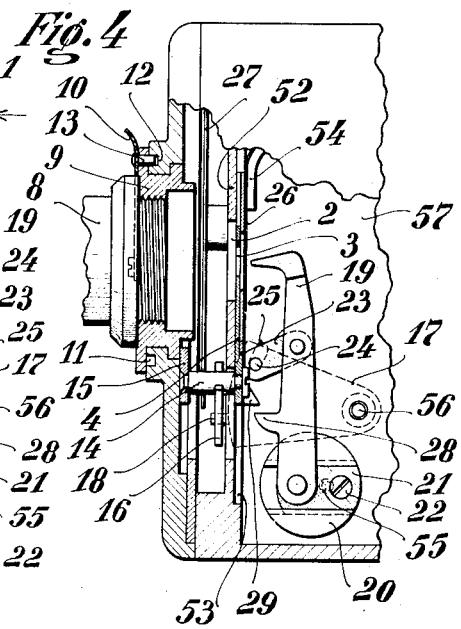
INVENTORS
Helmut Becker, Heinrich Broschke,
BY  Otto Sänger.
Ivan E. A. Konigsberg
ATTORNEY Jan. 9, 1940.  H. BECKER ET AL  2,186,443
MOTION PICTURE CAMERA
Filed Sept. 29, 1937  2 Sheets-Sheet 2
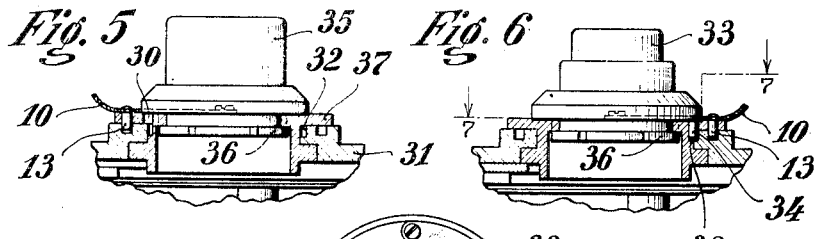
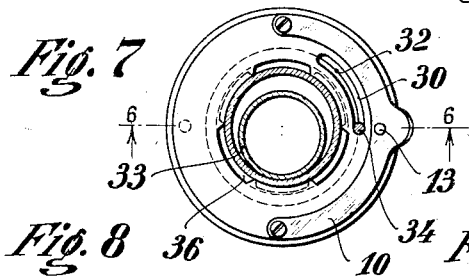
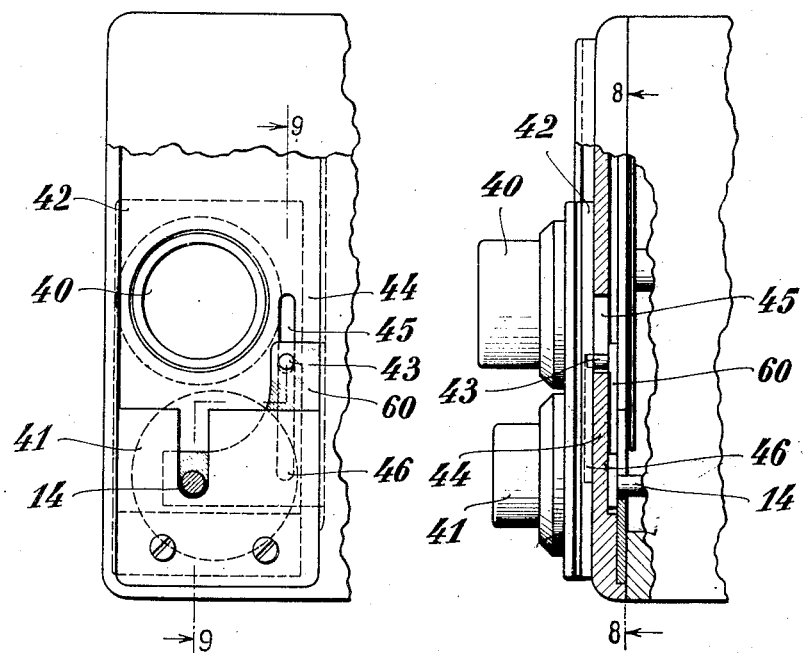
INVENTORS
Helmut Becker, Heinrich Broschke,
Otto Sänger.
BY
Ivan E. A. Konigsberg
ATTORNEY Patented Jan. 9, 1940

2,186,443

UNITED STATES PATENT OFFICE 2,186,443

MOTION PICTURE CAMERA

Helmut Becker, Heinrich Broschke, and Otto Sänger, Wetzlar, Germany, assignors to Ernst Leitz G. m. b. H., Wetzlar, Germany Application September 29, 1937, Serial No. 166,286
In Germany November 5, 1936

16 Claims. (Cl. 88—18.4)

This invention relates to improvements in motion picture cameras of the type which are arranged to operate with two kinds of film which differ in the size of the pictures and in the length of movement of each individual picture. In such cameras it is known to provide for the exchange of objectives, film windows and other parts, besides placing the film upon another film spool when the films are to be changed from one size to another. In prior arrangements the different mechanisms for effecting the change of films are operated wholly independently of each other by the manipulations of certain handles, knobs or levers. This is a disadvantage because the operator may forget to operates all of the independently operable parts and proceed to take pictures although all of the necessary changes have not been made.

The object of this invention is to provide means whereby the necessary changes in the positions of the film operating mechanisms for changing from one film to another film are so arranged that the operation of only a single element is required to correspondingly change the positions of the other elements, or so arranged, that the change or exchange of one element cannot take place before other elements have been operated. The operator is therefore assured that when the shifts over a certain element for the use of another film, all the other elements which require change in position have also been shifted into corresponding other positions. The arrangement also includes a device for warning the operator to change a certain element before proceeding to take pictures with the other film.

Accordingly the invention is embodied in a motion picture camera in which for instance the shifting of the objective from one position to another for changing from a large film to a small film also automatically moves a small film window into proper operating position and places a warning device in such a position as to warn the operator to change the stroke of the film operating pawl. The invention also includes means for providing the objectives and their mountings with certain cooperating fittings which are so spaced or shaped as to insure that only a certain objective can be placed upon the camera to be used with a given size film. In the accompanying drawings illustrating the invention:

Fig. 1 is a view of a portion of a motion picture camera looking from the inside towards the objective, the view being taken substantially on the line 1—1 of Fig. 3 and with parts removed and broken away.

Fig. 2 is a similar view looking from the inside toward the film in the direction of the arrow 2 in Fig. 3, parts being in section and parts broken away.

Fig. 3 is a vertical sectional view taken substantially on the line 3—3 of Fig. 1, with parts removed and broken away.

Fig. 4 is a view similar to Fig. 3 but shows the parts in their positions when the camera has been changed over to operate with a smaller film.

Fig. 5 is a view of an objective and its mounting arranged to be used for both large and small films.

Fig. 6 is a sectional view of an objective and its mounting adapted to be used only with a small film and taken on the line 6—6 of Fig. 7.

Fig. 7 is a front view of the objective arrangement shown in Fig. 6, the view being taken on the line 7—7 of Fig. 6.

Fig. 8 is a view looking from the inside of the camera towards two interchangeable objectives, the view being taken on the line 8—8 of Fig. 9.

Fig. 9 is a view partly in elevation and partly in section on the line 9—9 of Fig. 8.

In describing this invention the terms large and small films will be used as a matter of convenience, it being understood that the large film is a wider film which takes larger pictures, while a small film is a narrow film which takes smaller pictures and which therefor is operated at a shorter stroke.

In the drawings the numeral I denotes a motion picture camera having a raised annular flange 50 for receiving the objective carrier 9 which in turn supports the objective 8. The carrier 9 is rotatably held in the camera and has a pin 13 adapted to be seated in either the hole 11 or in the hole 12 in the flange 50. The pin is movably secured to the carrier by a spring 10 which serves as a handle for lifting the pin out of the hole 11 or 12 and for rotating the carrier and the objective. The latter is mounted eccentrically in the carrier as shown in Fig. 1. The carrier is provided with two fingers 6 and 7. Adjacent the front wall of the camera there is supported a slide 15 with a nose 5 adapted to be engaged by either of the fingers 6 or 7. The slide 15 carries a stud 14 whereby the slide is connected to a small film window slide 4 which is provided with the small film window 3. The window slide 4 slides in a vertical guideway 53 in the camera wall 52 which contains the large film window 2 in axial alinement with the center of the objective 8. The film is marked 26 and 54 indicates a film guide member. The camera shutter is indicated at 27 in Fig. 2. The details of the shutter and the film spools are not shown as they are no part of this invention and may be of usual standard construction.

The film, either the large film or the small film, is operated in the usual manner by a film pawl 19 which is pivoted to a slide 21 in the pawl driving disk 20. The slide 21 is held in one of two different positions in the disk by a screw 22 which enters one of the two screw holes 55 in the disk. The pawl 19 is steered by a link 23 pivoted at 24 in a sector arm 17 which is pivoted at 56 to the camera wall 57, Fig. 2. The pivot 24 extends through the wall through a slot 25 therein which limits the movements of the pin 24 around the pivot 56 as will be understood. The sector arm 17 is operated by means of a tooth 18 which is engaged by the one forked end of the lever 16 as seen in Fig. 1. The lever 16 is oscillated on its pivot 51 by having its other forked end engaging the stud 14.

Figs. 1, 2 and 3 show the parts in their positions when the large film is used. It is assumed that the objective 8 is usable for both a large and a small film. It will be understood without further detailed description that the film 26 is operated past the large film window 2 by the film pawl 19 which is operated by rotation of the disk 20. The driving means for the disk are not shown.

If the operator now desires to shift to a smaller film the operation is as follows. The handle 10 on the objective carrier 9 is moved outward to lift the pin 13 out of the hole 11. Then the carrier is rotated 180° which brings the optical axis of the objective in line with the center of the small film window and the operator then lets go of the handle 10 so that the pin 13 is now seated in the other hole 12 and the objective thus held in position for the small film. The rotary movement of the objective carrier is anti-clockwise as viewed in Fig. 1 hence the finger 7 is moved in under the nose 5 on the slide 15 to lift the latter from the positions shown in Figs. 1 and 2 into the position shown in Fig. 4. Consequently the stud 14 is also lifted and with it the small window slide 4 whereby to bring the small film window 3 into alinement with the objective. The window slide 4 has a lug 29 at its lower end and the film pawl has a nose 28. When the slide 4 has been lifted into the position shown in Fig. 4 and the operator attempts to operate the camera, the nose 28 on the pawl will strike the lug 29 with a blow which notifies the operator that he has not set the film pawl for the shorter stroke required for the small film. The operator now removes the screw 22, slides the slide 21 into the position shown in Fig. 4 and the camera is now ready for operation with a small film. Operations in the reverse order result in a change from a small to a large film.

As a further means to insure that the camera will not be operated with a particular size film unless all the necessary changes in the operating parts have been made, the objectives may be provided with certain fittings to indicate that a certain objective must be used with a particular film. Referring to Fig. 5 the objective carrier 37 may be provided with a curved slot 30 of a given size and the wall 31 has an annular groove 32. The objective 35 in Fig. 5 is usable with both kinds of film and is inserted in the carrier 37 by means of the usual bayonet joint connection 36. The objective 33 in Fig. 6 is usable only with the small film and is therefore provided with a pin 34 which fits into the grooves 30 and 32, the groove 30 being long enough to afford operation of the bayonet joint 36. In other words the objective 33 can only be attached to the objective carrier 37 after the latter has been rotated into position for use for the small film. It is of course within the scope of the invention to arrange similar fitting means to insure that only an objective usable with the large film can be inserted in the carrier.

A modification of the invention is illustrated in Figs. 8 and 9 where two objectives 40 and 41 are mounted upon a common slide 42. The objectives are offset with respect to each other to such an extent that the objective axis of the objective 40 registers with the center of the large film window 2 while the axis of the objective 41 registers with the center of the small film window 3.

The objective slide 42 has a long slot 46 in registry with a short slot 45 in the camera wall 44. The slide 60 which corresponds to the slide 15 in Figs. 1 to 4 has a pin 43 which extends into the said two slots 45 and 46. The slide 60 carries a stud 14 which functions like the stud 14 in Fig. 2 to lift the small film window slide 4. When a change is to be made to the small film, the operator takes hold of the objectives and raises the lower objective 41 into photographing position. When the bottom of the longer slot 46 reaches the pin 43 the latter and the slide 60 are lifted to the top of the shorter slot 45. Thus the stud 14 is lifted to lift the small film window into photographing position.

It will be seen therefore that when an objective, 8 in Fig. 1 or 40 in Fig. 8, is moved out of photographing position with respect to one kind of film, the small window slide is automatically moved into proper position and the operator is warned to set the pawl for the kind of film used. Also, that by means of certain fittings means are provided for insuring that only the correct objective is inserted into the objective carrier.

We claim:

1. A motion picture camera for exposing either a large picture film or a small picture film, said camera having a fixed large film window for exposing the large picture film, an objective, a movable carrier supporting the objective in optical register with the large film window, a movable slide having a small film window for exposing the small picture film, means for supporting said slide with its small film window in a position different from that of the large film window and mechanism for simultaneously operating the objective carrier and the said slide to place the objective and the small film window in optical registry with each other in photographing position to expose the small picture film instead of the large picture film.

2. A motion picture camera for exposing either a large picture film or a small picture film, said camera having a fixed large film window for exposing the large picture film, an objective, a movable carrier supporting the objective in optical register with the large film window, a movable slide having a small film window for exposing the small picture film, means for supporting said slide with its small film window in a position different from that of the large film window and mechanism for simultaneously operating the objective carrier and the said slide to place the objective and the small film window in optical registry with each other in photographing position to expose the small picture film instead of the large picture film, said mechanism comprising a sliding member connected to the said small film window slide and means on the objective carrier for operating said sliding member to actuate the said slide.

3. A motion picture camera for exposing either a large picture film or a small picture film, said camera having a fixed large film window for exposing the large picture film, a movable slide having a small film window for exposing the small picture film, means for supporting said slide with its small film window in a position different from that of the large film window, an objective, a movable carrier supporting the objective in optical register with the large film window, means for operating the carrier to move the objective into a position to register optically with the small film window and mechanism actuated by the carrier when it is operated as aforesaid for automatically moving the slide to place the small film window into optical register with the objective to expose the small picture film.

4. A motion picture camera for exposing either a large picture film or a small picture film, said camera having a fixed large film window for exposing the large picture film, an objective, a movable carrier supporting the objective in optical register with the large film window, a movable member having a small film window for exposing the small picture film, means for supporting said slide with its small film window in a position different from that of the large film window, a film advancing pawl, a steering link connected to the pawl for steering the stroke of the pawl to accord with the size of the pictures on the film to be advanced and mechanism for simultaneously moving the objective and the said member to place the objective and the small film window in optical registry with each other in position to expose the small picture film and to correspondingly position the said steering link to adjust the stroke of the pawl to accord with the size of the pictures in the small picture film.

5. A motion picture camera for exposing either a large picture film or a small picture film, said camera having a fixed large film window for exposing the large picture film, a movable small film window for exposing the small picture film in a position different from that of the large film window an objective, an adjustable carrier supporting the objective in optical registry with the large film window, a film feeding pawl, a disk for driving the same, a steering link connected to the pawl for adjusting the stroke of the pawl to accord with the size of the pictures on the film to be fed by the pawl, mechanism operatively connecting the steering link to the objective carrier and to the movable small film window, and means for operating the carrier to move the objective and the small film window into registry with the large film window to photograph pictures on the small picture film and simultaneously therewith change the position of the steering link to adjust the stroke of the feeding pawl to feed the small picture film.

6. A motion picture camera for exposing either a large picture film or a small picture film, said camera having a fixed large film window for exposing the large picture film, a movable small film window for exposing the small picture film in a position different from that of the large film window, a rotatable objective carrier, an objective eccentrically supported in said carrier, means for rotating the carrier to place the objective in optical registry with either of said film windows and means, automatically actuated by rotation of the objective carrier, for moving the small film window into optical registry with the objective when the latter has been moved into position to photograph on the small picture film.

7. A motion picture camera for exposing either a large picture film or a small picture film, said camera having a fixed large film window for exposing large films and a movable small film window for exposing small films, means for supporting said film window in a position different from that of the large film window, a pawl for feeding the film, a disk for driving the pawl, adjustable means for pivoting the pawl on the disk in one of two different positions dependent upon whether the large picture film or the small picture film is to be operated by the pawl, a steering link connected to the pawl, means for moving the small film window to place the same in photographing position to expose small films and means automatically actuated by said placing means for adjusting the position of the steering link to guide the stroke of the pawl to accord with the feeding of the film to be used.

8. A motion picture camera according to claim 7 in which the steering link adjusting means includes a member preventing the pawl from feeding the small picture film if the pivotal connection between the pawl and its driving disk has not been changed to drive the pawl to feed the small picture film.

9. A motion picture camera for exposing either a large picture film or a small picture film, said camera having a large film window for exposing the large picture film, a movable slide having a small film window for exposing the small picture film in a position different from that of the large film window, a rotatable objective carrier, an objective eccentrically supported in the carrier, a sliding member connected to the small window slide and fingers in the objective carrier for automatically operating said sliding member to move the window slide to place the small film window in position to expose the small picture film when the objective has been moved into position to photograph thereon.

10. A motion picture camera according to claim 9 including a film feeding pawl, a steering link for guiding said pawl, a sector arm for positioning the steering link in one of two different positions dependent upon the film to be fed by the pawl and means operatively connecting the sector arm and the said sliding member to position the steering link to accord with the position of the said small window slide.

11. A motion picture camera for exposing either a large picture film or a small picture film, said camera having a fixed large film window for exposing the large picture film, a movable small film window, means for moving the small film window into position to expose the small picture film and out of said position when the large picture film is to be exposed, an objective and means for moving the same into optical alinement with either of said film windows to photograph on the film exposed therethrough, and mechanism connecting the objective moving means and the means for moving the small film window for automatic operation of said last mentioned means.

12. A motion picture camera for exposing either a large picture film or a small picture film, said camera having a large fixed film window for exposing the large picture film, a slide having a single small picture window for exposing the small picture film in a position different from that of the large film window, an objective for photographing upon the large picture film through the large film window, a second objective for photographing upon the small picture film through the small film window, means for moving the objectives to place either of them in photographing position and means for automatically moving the said slide to place the single small film window therein in exposure position when the second objective has been moved into photographing position 13. A motion picture camera for exposing either a large picture film or a small picture film, said camera having a large fixed film window for exposing the large picture film, a slide having a single small film window for exposing the small picture film in a position different from that of the large film window, an objective for photographing upon the large picture film through the large film window, a second objective for photographing upon the small picture film through the small film window, a common support for said objectives to move either of them into photographing position and means connecting the common support to the said slide for automatically operating the latter to move the single small film window therein into film exposure position when the second objective has been moved into photographing position.

14. A motion picture camera for exposing either a large picture film or a small picture film, said camera having a fixed large film window through which both sizes of films are exposed, a first photographic objective for photographing objects through said large window upon a large picture film, a movable slide having a small film window for exposing the small picture film through said small and large film windows, means supporting said slide with its small film window in a position different from that of the large film window, a second photographic objective for photographing objects through said large and small film windows, a carrier upon which the said two objectives are supported, means for supporting said carrier with the first objective in photographic registry with the large film window and with the second objective out of register therewith, means for simultaneously moving the first objective out of said photographic register and operating the second objective and the said slide to place said second objective and the small film window into optical photographic registry with the large film window and means on the carrier and on the objectives insuring against accidental exchange of the said two objectives.

15. A motion picture camera for exposing either a large picture film or a small picture film, said camera having a fixed large film window through which both sizes of films are exposed, a movable slide having a small film window for exposing only the small picture film, means for supporting the slide with its small film window in a position different from that of the large film window while a large picture film is being exposed, a movable objective carrier, a photographic objective thereon for photographing objects through the large film window and means for moving said carrier to move the said objective from said photographing position and simultaneously therewith move the said slide to place the small film window in registry with the large film window to expose small picture films.

16. A motion picture camera for exposing either a large picture film or a small picture film, said camera having a fixed large film window for exposing a large film and a movable slide with a small film window for exposing a small film, said film windows being arranged to permit a single feeding means to engage the film to feed the same, means for supporting the said slide with its small film window in a different position from that of the large film window, a movable objective carrier, a photographic objective supported thereon in optical photographic relation to the large film window, means for operating said carrier to place the objective in a position to register photographically with the small film window, mechanism actuated by the carrier when it is operated as aforesaid to automatically move said slide to place the small film window into registry with the objective to expose the small picture film and a single film feeding mechanism for engaging either of said films to feed the same.

HELMUT BECKER.
HEINRICH BROSCHKE.
OTTO SÄNGER.